United States Patent
Gavish et al.

(10) Patent No.: US 7,490,328 B2
(45) Date of Patent: Feb. 10, 2009

(54) METHOD AND APPARATUS FOR ALLOCATING PROCESSOR POOL RESOURCES FOR HANDLING MOBILE DATA CONNECTIONS

(75) Inventors: Amnon Gavish, Bikaat-Beit-Hakerem (IL); Abner Volterra, Zichron-Yaacov (IL)

(73) Assignee: Surf Communication Solutions, Ltd., Yokneam (IL)

( * ) Notice: Subject to any disclaimer, the term of this patent is extended or adjusted under 35 U.S.C. 154(b) by 931 days.

(21) Appl. No.: 10/275,791

(22) PCT Filed: Mar. 11, 2001

(86) PCT No.: PCT/IL01/00232

§ 371 (c)(1), (2), (4) Date: Nov. 8, 2002

(87) PCT Pub. No.: WO01/86466

PCT Pub. Date: Nov. 15, 2001

(65) Prior Publication Data

US 2003/0140147 A1    Jul. 24, 2003

(30) Foreign Application Priority Data

May 9, 2000    (WO) .................. PCT/IL00/00266

(51) Int. Cl.
G06F 9/46    (2006.01)
H04Q 7/20    (2006.01)

(52) U.S. Cl. .................. 718/105; 455/452.2; 455/453

(58) Field of Classification Search ......... 370/229–463, 370/395.2; 455/3.03, 3.04, 560, 561, 436–439, 455/450–453, 456.5, 456.6, 464, 443; 709/223–226, 709/231–237; 718/104, 105
See application file for complete search history.

(56) References Cited

U.S. PATENT DOCUMENTS 4,827,499 A * 5/1989 Warty et al. .................. 455/560
4,965,641 A   10/1990 Blackwell et al.

(Continued)

FOREIGN PATENT DOCUMENTS

EP    0 491 489    6/1992

(Continued)

OTHER PUBLICATIONS

Eyuboglu, V.M. et al.; "Advanced Modulation Techniques for V.Fast"; May-Jun. 1993; pp. 243-256; European Trans.On telecomm. And Related Tech.; vol. 4; No. 3.

(Continued)

*Primary Examiner*—Meng-Ai An
*Assistant Examiner*—Charles E Anya
(74) *Attorney, Agent, or Firm*—Robert G. Lev; Yaakov Schatz

(57) ABSTRACT

A method of operating a processor pool having a given maximal processing power, in handling mobile data connections. The method includes connecting a plurality of mobile data connections, which may require up to a total peak processing power which is substantially greater than the given maximal processing power of the processor pool, to the processor pool, and processing data transmitted on at least one of the connected data connections, by the processor pool.

37 Claims, 4 Drawing Sheets

U.S. PATENT DOCUMENTS

| | | | | |
|---|---|---|---|---|
| 4,974,256 A | * | 11/1990 | Cyr et al. | 379/112.04 |
| 5,287,461 A | | 2/1994 | Moore et al. | |
| 5,349,682 A | * | 9/1994 | Rosenberry | 718/102 |
| 5,412,656 A | * | 5/1995 | Brand et al. | 370/428 |
| 5,446,730 A | | 8/1995 | Lee et al. | |
| 5,546,388 A | | 8/1996 | Lin | |
| 5,590,345 A | | 12/1996 | Barker et al. | |
| 5,649,108 A | | 7/1997 | Spiegel et al. | |
| 5,687,167 A | | 11/1997 | Bertin et al. | |
| 5,701,482 A | * | 12/1997 | Harrison et al. | 718/105 |
| 5,721,830 A | | 2/1998 | Yeh et al. | |
| 5,729,542 A | | 3/1998 | Dupont | |
| 5,748,629 A | | 5/1998 | Calrada et al. | |
| 5,774,668 A | | 6/1998 | Choquier et al. | |
| 5,790,533 A | * | 8/1998 | Burke et al. | 370/318 |
| 5,790,534 A | * | 8/1998 | Kokko et al. | 370/335 |
| 5,790,781 A | | 8/1998 | Cox et al. | |
| 5,794,058 A | | 8/1998 | Resnick | |
| 5,799,064 A | | 8/1998 | Sridhar et al. | |
| 5,805,827 A | | 9/1998 | Chau et al. | |
| 5,809,066 A | * | 9/1998 | Suomi et al. | 375/222 |
| 5,828,847 A | | 10/1998 | Gehr et al. | |
| 5,852,655 A | | 12/1998 | McHale et al. | |
| 5,881,050 A | | 3/1999 | Chevalier et al. | |
| 5,889,989 A | * | 3/1999 | Robertazzi et al. | 718/105 |
| 5,892,818 A | * | 4/1999 | Lee | 379/112.1 |
| 5,896,376 A | * | 4/1999 | Alperovich et al. | 370/348 |
| 5,896,386 A | * | 4/1999 | Johnston | 370/466 |
| 5,905,725 A | | 5/1999 | Sindhu et al. | |
| 5,909,384 A | | 6/1999 | Tal et al. | |
| 5,920,599 A | | 7/1999 | Igarashi | |
| 5,925,114 A | | 7/1999 | Hoang | |
| 5,931,950 A | | 8/1999 | Hsu | |
| 5,935,249 A | | 8/1999 | Stern et al. | |
| 5,960,035 A | | 9/1999 | Sridhar et al. | |
| 5,966,659 A | * | 10/1999 | McDonald et al. | 455/445 |
| 5,982,750 A | * | 11/1999 | Tabe et al. | 370/233 |
| 5,982,776 A | | 11/1999 | Manning et al. | |
| 5,982,814 A | | 11/1999 | Yeh et al. | |
| 5,983,282 A | | 11/1999 | Yucebay | |
| 5,987,135 A | | 11/1999 | Johnson et al. | |
| 5,995,540 A | | 11/1999 | Draganic | |
| 5,999,809 A | * | 12/1999 | Watanabe | 455/421 |
| 6,006,318 A | | 12/1999 | Hansen et al. | |
| 6,070,192 A | | 5/2000 | Holt et al. | |
| 6,088,732 A | | 7/2000 | Smith et al. | |
| 6,104,721 A | * | 8/2000 | Hsu | 370/431 |
| 6,112,243 A | | 8/2000 | Downs et al. | |
| 6,148,006 A | | 11/2000 | Dyke et al. | |
| 6,154,445 A | | 11/2000 | Farris et al. | |
| 6,160,843 A | | 12/2000 | McHale et al. | |
| 6,161,201 A | | 12/2000 | Payne et al. | |
| 6,163,599 A | | 12/2000 | McHale | |
| 6,181,694 B1 | | 1/2001 | Pickett | |
| 6,185,698 B1 | | 2/2001 | Wesley et al. | |
| 6,195,699 B1 | | 2/2001 | Dennis | |
| 6,226,277 B1 | | 5/2001 | Chuah | |
| 6,307,836 B1 | | 10/2001 | Jones et al. | |
| 6,349,123 B1 | | 2/2002 | Kim | |
| 6,385,203 B2 | | 5/2002 | McHale et al. | |
| 6,411,617 B1 | | 6/2002 | Kilkki et al. | |
| 6,457,037 B1 | | 9/2002 | Maytal | |
| 6,466,976 B1 | | 10/2002 | Alles et al. | |
| 6,473,781 B1 | | 10/2002 | Skagerwall et al. | |
| 6,490,287 B1 | | 12/2002 | Kilkki | |
| 6,490,298 B1 | | 12/2002 | Chin et al. | |
| 6,502,062 B1 | | 12/2002 | Acharya et al. | |
| 6,516,350 B1 | | 2/2003 | Lumelsky et al. | |
| 6,553,376 B1 | | 4/2003 | Lewis et al. | |
| 6,577,871 B1 | * | 6/2003 | Budka et al. | 455/453 |
| 6,603,745 B1 | * | 8/2003 | Antonio et al. | 370/318 |
| 6,614,794 B1 | | 9/2003 | Adas et al. | |
| 6,631,354 B1 | | 10/2003 | Leymann et al. | |
| 6,667,972 B1 | | 12/2003 | Foltan et al. | |
| 6,711,159 B1 | | 3/2004 | Grabelsky et al. | |
| 6,714,532 B1 | | 3/2004 | Kawaguchi | |
| 6,741,572 B1 | | 5/2004 | Graves et al. | |
| 6,907,462 B1 | | 6/2005 | Li et al. | |
| 6,963,551 B2 | * | 11/2005 | Uebayashi et al. | 370/335 |
| 2001/0012778 A1 | * | 8/2001 | Eriksson et al. | 455/436 |

FOREIGN PATENT DOCUMENTS

| | | |
|---|---|---|
| EP | 0 831 624 | 3/1998 |
| EP | 0 859 492 | 8/1998 |
| EP | 0 913 770 | 5/1999 |
| WO | WO 98/54868 | 12/1998 |
| WO | WO 99/06913 | 2/1999 |
| WO | WO 99/20033 | 4/1999 |
| WO | WO 99/39530 | 8/1999 |
| WO | WO 00/11843 | 3/2000 |

OTHER PUBLICATIONS

Forney, E.G. et al.; "The V.34 High-Speed Modem Standard"; Dec. 1996; pp. 28-33; IEEE Communications Magazine.

Crovella, M.E. et al.for USENIX; Abstracts "Connection Scheduling in Web Servers"; last changed Sep. 23, 1999; 1 page retrieved from the internet on Jan. 30, 2002<http://www.usenix.org/events/usits99/crovella.html>.

Gopalakrishnan, R. et al.; "Efficient User-Space Protocol Implementations with QoS Guarantees Using Real-Time Upcall"; Aug. 4, 1998; pp. 374-388; IEEE/ACM Transactions on Networking; vol. 6; No. 4; XP000771968.

MacVittie, D. for Sun.com; "Best Practices How-Tos: Tuning your iPlanet™ Web Server"; Nov. 19, 2001; pp. 1-7; retrieved from the internet on Jan. 24, 2002 <http://dcb.sun.com/practices/howtos/tuning_iplanet.jsp>.

"T.38"; ITU-T Telecommunications Standardization Sector of ITU; Jun. 18, 1998; XP002163782.

Gieseler, S.; "TunnIbau. Remote-Access-Server als Basis für Virtual Private Networks"; Net-Zeitschrift Fuer Kommunikationsmanagement, Huthig Verlag; vol. 52; No. 8/9; 1998; pp. 38-40; XP000782761.

Evolution Toward Third Generation Wireless Networks; pp. 1-18; last modifiedNov. 21, 1999; downloaded on Feb. 7, 2000; retrieved from the Internet <http://www.cis.ohio-state.edu/~jain/cis788-99/3g_wireless/index.html>.

Held,G.; "The Complete Modem Reference;" John Wiley and Sons; pp. 260-262; XP002153737.

\* cited by examiner

METHOD AND APPARATUS FOR ALLOCATING PROCESSOR POOL RESOURCES FOR HANDLING MOBILE DATA CONNECTIONS

RELATED APPLICATION

The present application is a U.S. national application of PCT/IL01/00232, filed Mar. 11, 2001.

FIELD OF THE INVENTION

The present invention relates to communication systems and in particular to systems for handling remote access connections.

BACKGROUND OF THE INVENTION

Cellular ground networks are generally formed of a plurality of base transceiver stations (BTSs) which wirelessly contact mobile units serviced by the network. The BTSs are connected in a tree topology to a regional base station controller (BSC) which controls the routing of calls in the network. Usually, a single BSC is connected to tens or hundreds of BTSs. The BSC is generally connected to a mobile switching center (MSC) which in turn is connected to other BSCs and to one or more public telephone networks. When a call is established with a mobile unit, a channel is generally allocated between the mobile unit and the MSC through a BSC and one or more BTSs, to pass the signals of the call to and from the mobile unit.

Cellular networks can be used to transmit data packets, in addition to phone calls. A protocol for such data transmission is referred to as a general packet radio service (GPRS) and is described, for example, in an emerging ETSI draft standard for GSM, GSM 03.60 version 7.4.0 Release 1998, the disclosure of which is incorporated herein by reference. In accordance with the GPRS, the BSCs are connected to GPRS support nodes (GSNs) which pass the data packets to their destinations on IP networks. For example, the GSNs may serve as gateways to the Internet. In many cases the GSNs are located adjacent to or within respective MSCs.

Generally, mobile data connections are formed between mobile units requesting to transmit and/or receive data and the GSN. The connections pass partially through over a wireless link between a BTS and the mobile unit and partially on a link connecting the BTS to the GSN. The GSN generally includes an array of dedicated ASIC processors which each handles a single mobile data connection. The number of ASIC processors positioned in a GSN is limited by various physical constrains, such as the space required for the processors and their cost. For each active data connection, the GSN manages a serving GPRS support node (SGSN) which controls the connection and a gateway GPRS support node (GGSN) which serves as an interface between the mobile network and a packet based network, i.e., an IP network. The GGSN generally compresses the signals transmitted to the mobile unit, in order to conserve wireless bandwidth.

Some service providers use for the channel connecting the GSN to an IP network a link with a bandwidth lower than the total bandwidth of the connections from the GSN to the mobile units. This is possible because the connections between the GSN and the mobile units are not always fully utilized. The size of the link is chosen so that statistically, the chances of the bandwidth actually required by the mobile units is nearly never greater than the links bandwidth.

SUMMARY OF THE INVENTION

An aspect of some embodiments of the present invention relates to a GSN processor pool, having a given processing power, which concurrently services a number of mobile data connections which is greater than could be handled with the given processing power of the processor pool if each mobile unit requires its maximal data rate. In some embodiments of the invention, the number of mobile units which the GSN accepts for concurrent handling is selected according to statistical estimates, such that the actual service required from the processor pool will (statistically) almost never exceed the capabilities of the processor pool.

In some embodiments of the invention, the processing power of the processor pool is sufficient to handle an accumulated data rate substantially equal to the data rate supported by an IP link connecting the GSN to an IP network.

Generally, the processor pool executes for each connected mobile unit a process which handles the packets of the mobile unit. In some embodiments of the invention, the processor pool has a scheduler which dynamically transfers the handling of processes between processors of the pool according to the load on the processors; The dynamic transfer of processes between the processors of the pool allows the use of statistical assumptions which relate to the entire pool as a single entity.

In an embodiment of the invention, when at a specific moment the accumulated data rate required by the mobile units handled by the GSN is beyond the capability of the GSN processor pool, one or more low quality of service (QoS) mobile units are given delayed service. Alternatively or additionally, the limited service is distributed between the mobile units, such that each mobile unit suffers only from a slight decrease in service.

An aspect of some embodiments of the invention relates to a GSN processor pool which keeps track of the time during which data was not transmitted on the data channels it handles. If data is not transmitted on a channel for a predetermined time the compression history of the process is erased and/or the process is removed from the processor pool. Thus, the number of processes handled by the processor pool is enhanced while the memory utilization is reduced.

There is therefore provided in accordance with an embodiment of the present invention, a method of operating a processor pool having a given maximal processing power, in handling mobile data connections, comprising connecting a plurality of mobile data connections, which may require up to a total peak processing power which is substantially greater than the given maximal processing power of the processor pool, to the processor pool, and processing data transmitted on at least one of the connected data connections, by the processor pool.

Optionally, processing data transmitted on the at least one of the connections comprises processing data of a single connection by a plurality of the processors in the processor pool. In some embodiments of the invention, processing data of a single connection by a plurality of the processors in the processor pool comprises processing data transmitted on the single connection by the plurality of processors, substantially concurrently. Optionally, processing data of a single connection by a plurality of the processors in the processor pool comprises processing data transmitted on the connection in a first direction by a first processor and data transmitted in a second direction by a second processor. Alternatively or additionally, processing data of a single connection by a plurality of the processors in the processor pool comprises processing data transmitted on the single connection by a plurality of processors, one after the other. Optionally, connecting the plurality of data connections comprises assigning each connection a processor to handle the data of the connection.

The method optionally includes changing, for at least one of the connections, the processor assigned to handle the connection. Optionally, changing, the processor assigned to handle the connection comprises changing the processor assigned to handle the connection while the connection is transferring data. In some embodiments of the invention, changing the processor assigned to handle the connection comprises changing substantially immediately after data of the connection is handled. The method optionally includes processing the data of the connection substantially immediately after the connection is transferred. Possibly, changing the processor assigned to handle the connection comprises changing the processor assigned to handle the connection, while the connection is idle. The method optionally includes keeping track of the processing load on each of the processors and transferring the handling of a connection from a first processor to a second processor responsive to the relative loads on the first and second processors. Optionally, keeping track of the processing load comprises keeping track of the amount of data waiting, in an input buffer, for handling by the processor and/or receiving indications from the processors.

Optionally, connecting the plurality of data connections comprises connecting data connections which may require up to a total peak processing power at least five times greater than the given maximal processing power of the processor pool.

In some embodiments of the invention, connecting the plurality of data connections comprises connecting a plurality of data connections which have the same peak processing power requirement level. Alternatively or additionally, connecting the plurality of data connections comprises connecting a plurality of data connections which have different peak processing power requirement levels. Optionally, processing data transmitted on at least one of the connected data connections comprises compressing signals transmitted on the at least one of the data connections. Optionally, processing data transmitted on at least one of the connected data connections comprises decompressing signals transmitted on the at least one of the data connections. Optionally, processing data transmitted on at least one of the connected data connections comprises compressing and decompressing signals transmitted on a first group of data connections and only compressing signals on a second group of data connections. Alternatively or additionally, processing data transmitted on at least one of the connected data connections comprises processing by at least one processor which handles data of a plurality of connections. The method optionally includes erasing a state record of connections which did not carry data for over a predetermined period. The method optionally includes disconnecting connections which did not carry data for over a predetermined period.

Optionally, connecting the plurality of mobile data connections comprises connecting general purpose radio service (GPRS) connections.

There is further provided in accordance with an embodiment of the present invention, a method of determining whether to accept a candidate mobile data connection for handling by a processor pool, comprising defining a threshold level indicative of a processing power level substantially greater than the processing power of the processing pool, determining a value of a parameter indicative of the peak processing power which may be required in handling the candidate mobile data connection, calculating a value of a parameter indicative of a total peak processing power which would be required in handling all the connections handled by the processor pool at their respective peak processing powers if the candidate connection is accepted, and accepting the candidate connection if the value of the calculated parameter is lower than the threshold level:

Optionally, determining the value of the parameter which is indicative of the peak processing power comprises determining whether the candidate connection requires compression in one direction or in two directions and/or determining a peak data rate of the connection. Optionally, the parameter comprises the number of connections handled by the processor pool. The method optionally includes accepting the candidate connection at a low quality of service status if the value of the calculated parameter is greater than a first threshold level but is lower than a second threshold level.

Optionally, defining the threshold level comprises defining a threshold level which changes periodically. Optionally, the threshold level changes responsive to the time or date. Alternatively or additionally, the threshold level is changed responsive to a command from a human operator and/or to a traffic load in a network including the processor pool.

There is further provided in accordance with an embodiment of the present invention, a processor pool for servicing mobile data connections, comprising a plurality of processors each of which handles one or more mobile data connections, and a scheduler which dynamically schedules the mobile data connections handled by each of the processors.

Optionally, the scheduler transfers the handling of a data connection from a first processor to a second processor if the first processor has a large backup of accumulated data for processing relative to the second processor.

The processor pool optionally includes a common memory which includes a record for each of the data connections serviced by the processor pool. Optionally, the common memory is accessible by all the processors of the processor pool. Optionally, each of the data connections handled by the processor pool has a maximal data rate at which it may carry data and wherein the combined processing power of all the processors of the processor pool is substantially lower than the processing power required to handle all the data connections handled by the processor pool when they all carry data at their respective maximal data rates.

Optionally, connections of a first type are connected to a processor from a first group of the processors and connections of a second type are connected to a processor from a second group of the processors, different from the first group. Optionally, the first and second groups do not include common processors. Alternatively, the first and second groups include at least one common processor. In some embodiments of the invention, each mobile data connection is assigned a buffer of a size sufficient to store data received at the maximal rate of the connection for at least 10 seconds. Optionally, at least two of the connections have buffers of different sizes. Optionally, the size of the buffer of each connection is chosen responsive to the QoS of the connection.

There is further provided in accordance with an embodiment of the present invention, a method of servicing a mobile data connection by a processor pool including a plurality of processors, comprising handling the mobile data connection by a first processor, transferring the handling of the data connection to a second processor while the data connection is in force, and handling the data of the mobile data connection by the second processor.

In some embodiments of the invention, transferring the handling of the data connection is performed responsive to an increase in the processing power required for handling the data connection. Optionally, transferring the handling of the data connection is performed responsive to an increase in the processing power required by a different data connection serviced by the first processor. Optionally, transferring the handling of the data comprises transferring the connection while data is being received on the connection. Alternatively or additionally, transferring the handling of the data comprises transferring the connection while the connection is idle. Optionally, handling the mobile data connection comprises compressing and decompressing data transmitted on the connection.

BRIEF DESCRIPTION OF FIGURES

Exemplary non-limiting embodiments of the invention will be described with reference to the following description of embodiments in conjunction with the figures. Identical structures, elements or parts which appear in more than one figure are preferably labeled with a same or similar number in all the figures in which they appear, in which.

DETAILED DESCRIPTION OF EMBODIMENTS

Figure 1:
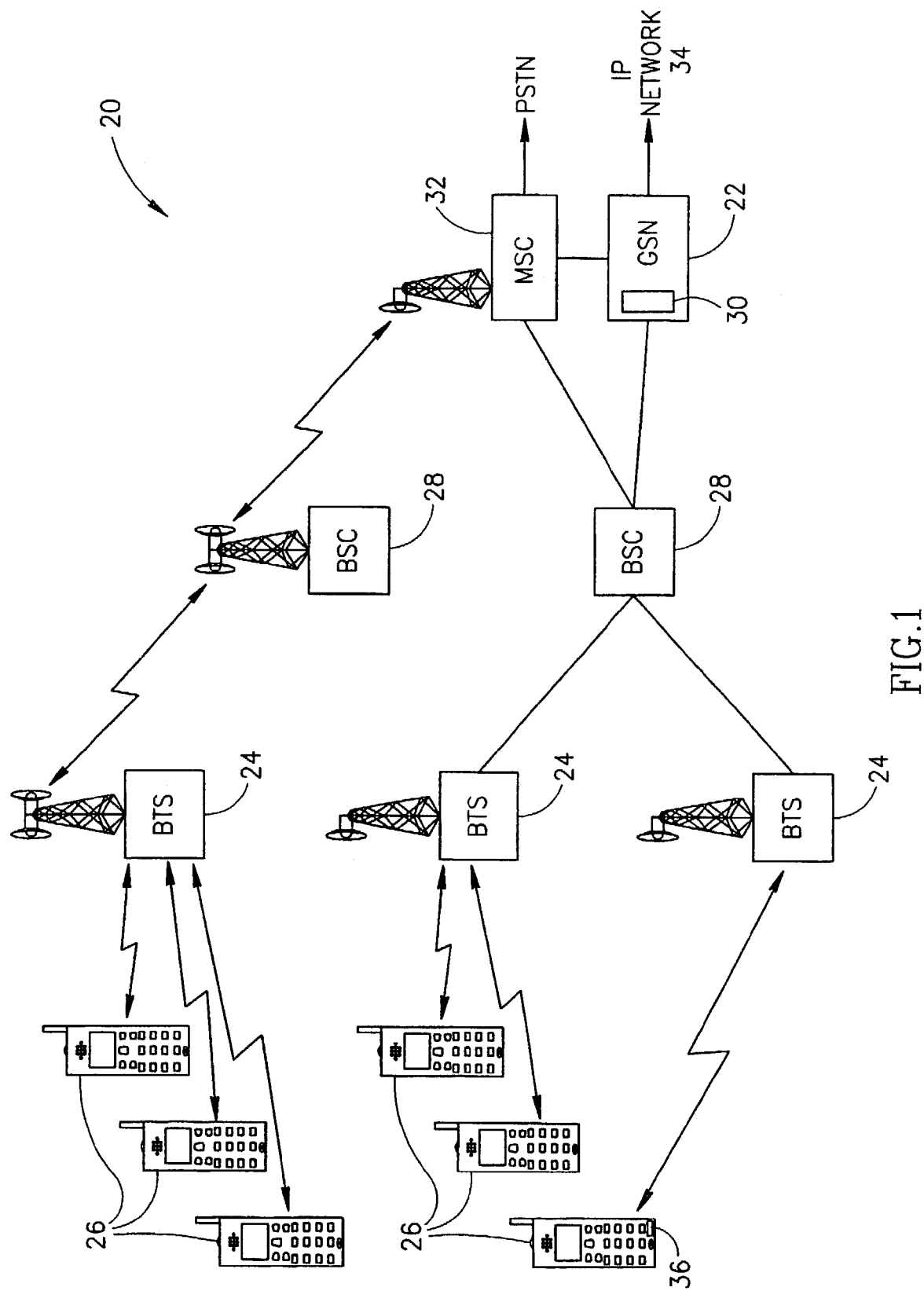
FIG. 1 is a simplified schematic block diagram of a mobile network including a GPRS support node (GSN), in accordance with some embodiments of the present invention.

FIG. 1 is a simplified schematic block diagram of a mobile network 20, in accordance with an embodiment of the present invention. Mobile network 20 comprises a plurality of base transmission stations (BTSs) 24 which service mobile units 26 in their region. BTSs 24 are connected through cable or wireless links to base station controllers (BSCs) 28 which in turn connect to a mobile switching center (MSC) 32.

Some of mobile units 26 comprise GPRS units 36 which are used to transmit and receive data packets. Generally, GPRS units 36 receive data packets in a compressed format, which is used in order to conserve wireless bandwidth. In some cases, GPRS units 36 also transmit data in a compressed format, while in other cases the transmitted data is not compressed. In some embodiments of the invention, mobile units 26 comprise standard WAP-supporting telephone units and do not require any special apparatus in order to operate in accordance with the present invention.

Network 20 comprises a GPRS support node (GSN) 22 which serves as an interface between mobile units 26 and a packet based network (e.g., an IP network 34). In some embodiments of the invention, BSCs 28 are connected directly to GSN 22. Alternatively or additionally, BSCs 28 connect to GSN 22 through MSC 32.

When a user of a mobile unit 26 wishes to connect to IP network 34, the mobile unit 26 generates an appropriate request. If the request is granted a data connection is allocated between the mobile unit 26 and GSN 22.

In some embodiments of the invention, GSN 22 comprises a processor pool 30 which runs software modules which interface between mobile network 20 and IP network 34. Optionally, processor pool 30 compresses signals transmitted to mobile units 26 and/or decompresses signals received from mobile units 26. The compression and/or decompression may be performed according to substantially any suitable compression method, for example one or more of the methods described in the V.42 and/or V.44 ITU recommendations. The compression may include the data portion of the received packet without one or more of its headers or may include the entire packet including the headers. It is noted that the compression of a single packet may depend on the contents of previous packets transmitted on the same connection.

Figure 2:
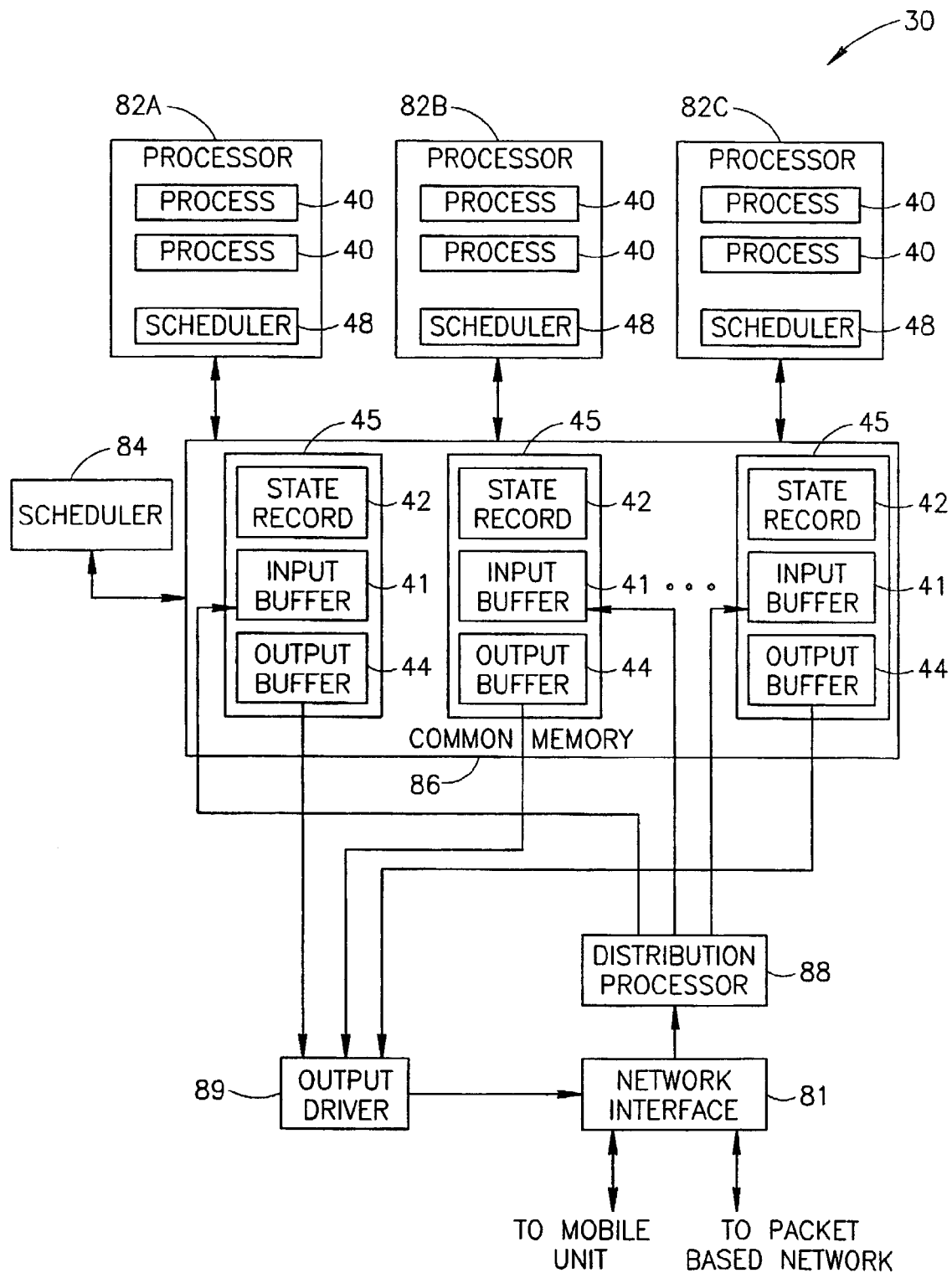
FIG. 2 is a schematic block diagram of a processor pool, in accordance with some embodiments of the present invention.

FIG. 2 is a schematic block diagram of processor pool 30, in accordance with an embodiment of the present invention. Processor pool 30 comprises a plurality of separate hardware processors 82 (marked 82A, 82B, etc.), which handle the data signals transmitted on the connections to mobile units 26.

In some embodiments of the invention, each mobile unit 26 currently serviced by processor 30 has a respective process 40 which handles the data transmitted on the connection to the mobile unit (e.g., compresses and/or decompresses the data). Alternatively, each mobile unit 26 has a pair of processes, one for data transmitted to the mobile unit 26 and one for data received from the mobile unit. Alternatively, the number of processes for each mobile unit 26 depends on the service provided to the mobile unit. For example, each mobile unit 26 may have a process for each direction in which compression is performed, e.g., one process if signals are compressed only in one direction and two processes if signals are transmitted in both directions. Optionally, mobile units 26 for which signals are not compressed at all, do not have a process 40. Alternatively, such mobile units have a process which perform other tasks.

In some embodiments of the invention, processor pool 30 includes a common memory 86 in which each process 40 has a respective storage area 45 which stores data related to the process. Each storage area 45 optionally includes a state record 42 which stores state information of the process, e.g., a compression dictionary. In addition, storage area 45 optionally includes an input buffer 41 which stores packets waiting for processing by the respective process and/or an output buffer 44 in which packets handled by the process 40 are placed for transmission to their destination. In some embodiments of the invention, each storage area 45 of a process 40 stores substantially all the information required by a processor 82 in order to handle the respective mobile unit 26. Thus, a processor 82 assigned to handle a mobile unit 26 does not need any information other than that found in the respective area 45 in common memory 86.

Alternatively to having a single input buffer 41 for each process 40, each process 40 which handles data in both directions of the connection has separate input buffers for each of the directions. Optionally, in this alternative, the processes 40 take data from the input buffers in an alternate order to provide substantially even handling to the data flowing in both directions. Alternatively, precedence is given to data flowing in one of the directions, e.g., from IP network 34 to mobile unit 26.

Generally, using current technology, each processor 82 can handle data of between about 4-10 connections. It is noted, however, that processors 82 which can handle any number of processes, particularly with the advance of technology, may be included in processor pool 30.

Generally, processor pool 30 has a given processing power which is the sum of the processing power of processors 82. Each mobile unit 26, which has a data connection currently handled by processor pool 30, utilizes an amount of processing power of processor pool 30. The utilized processing power is measured, for example, as a percentage of the given processing power of processor pool 30 or in millions of instructions per second (PS). The processing power utilized by each data connection is generally a function of the amount of data actually transmitted on the connection.

In some embodiments of the invention, network 20 allocates a number of data connections which, at a peak rate, may carry much more data than can be handled with the processing power of processor pool 30. Optionally, the allocated data connections may carry, at a peak rate, data whose handling requires two, five or even ten times the processing power of processor pool 30. The number of allocated data connections, however, is generally chosen such that the actual service required from processor pool 30 will (statistically) almost never exceed the capabilities of the processor pool. Alternatively, higher over-booking rates are used taking into account the more frequent chances of occurrence of a degradation in service. In some embodiments of the invention, an operator of GSN 22 can control the over-booking rate. It is noted that requests to connect when the GSN 22 is at its maximal utilization are rejected or are responded to with offers to receive a low quality of service (QoS) connection, as described below.

In some embodiments of the invention, the given processing power of processor pool 30 is related to the bandwidth of the link connecting GSN 22 to IP network 34, such that the processing power of processor pool 30 is substantially equal to the processing power required to handle the signals passing on the link connecting to IP network 34.

Processor pool 30 optionally includes a scheduler 84 which dynamically assigns processes 40 to respective processors 82. In some embodiments of the invention, scheduler 84 assigns processes 40 of newly accepted mobile units 26 to respective processors 82 and in addition transfers the handling of one or more processes 40 between processors 82, if necessary.

Each processor 82 has processing power for handling maximal data rates of a predetermined number of connections, concurrently. In order to increase the number of connections handled, each processor 82 handles a number of connections larger than for which it has processing power for handling maximal data rates, under the assumption that not all connections carry data concurrently. Allowing dynamic transfer of processes 40 between processors 82 makes processor pool 30 act as a single processor for statistical assumptions. That is, if at a specific moment all the connections of a specific processor 82 require data handling concurrently, some of the connections may be transferred to other processors 82 which are not as loaded. Thus, the margins required for peak usage times are calculated for processor pool 30 together, rather than separately for each processor 82.

Scheduler 84 optionally keeps track of the load on each of processors 82 and accordingly distributes the handling of the processes 40 between processors 82. In some embodiments of the invention, scheduler 84 keeps track of the amount of data waiting for processing by each of processors 82. Optionally, when one of processors 82 has a relatively large amount of data waiting for processing and one or more other processors 82 have a relatively small amount of data waiting for processing, the handling of one or more data connections is transferred from the loaded processor 82 to the one or more relatively free processors 82. Optionally, the connection is transferred while it is carrying data as described below with reference to FIG. 3. Alternatively or additionally, scheduler 84 transfers, when possible, connections which are not currently carrying data. Thus, the transfer cannot interfere with the transfer of data on the connection.

Alternatively or additionally, scheduler 84 distributes the handling of the data connections between processors 82 such that each processor 82 handles about the same number of data connections and/or data connections with substantially the same peak processing power requirements. Further alternatively or additionally, scheduler 84 receives from processors 82 indications on the load of the processors. The indications mat be received periodically and/or when the load goes above or below a predetermined threshold.

In some embodiments of the invention, when the load on a processor 82 goes above a predetermined threshold, e.g., 80%, some of the idle connections handled by the processor are transferred to other processors, in order to minimize the chances that a transfer of a connection carrying data will be required.

In some embodiments of the invention, the determination of the handling of which mobile unit 26 is to be transferred, is performed as described in PCT application PCT/IL00/00703 the disclosure of which document is incorporated herein by reference.

In some embodiments of the invention, the distribution of processes 40 between processors 82 depends on the QoS of the respective connections of the processes 40. Optionally, high QoS connections are distributed evenly between processors 82. Alternatively or additionally, one or more specific processors are used for high QoS connections. Further alternatively or additionally, scheduler 84 assumes higher processing-power consumption for high QoS connections, in distributing processes 40 between processors 82.

In some embodiments of the invention, processors 82 are divided into groups which handle data connections of different types. For example, one group of processors 82 may handle data connections which carry compressed signals in only one direction while a second group of processors 82 handles data connections which carry compressed signals in both directions. Alternatively, other methods for assigning the connections to processors 82, are used. By assigning each processor 82 only connections of a single type and/or which have common average processing requirements, the internal scheduling of processes within the processors 82 is simplified. In addition, having each processor 82 handle only connections of a single type simplifies the scheduling performed by scheduler 84.

Scheduler 84 optionally notifies each of processors 82, which processes 40 it is to handle and/or the addresses of the respective areas 45 in common memory 86. In some embodiments of the invention, scheduler 84 periodically notifies each of processors 82 which mobile units 26 it is to handle. Alternatively or additionally, when a new connection is accepted, scheduler 84 instructs one of processors 82 to handle the connection. In addition, when the handling of a mobile unit 26 is transferred from one processor 82 to another, scheduler 84 notifies the relevant processors 82. Optionally, scheduler 84 passes its instructions through common memory. 86. Alternatively, scheduler 84 is connected to processors 82 and passes them its instructions directly.

In some embodiments of the invention, each processor 82 runs a scheduler 48 which assigns processing sessions to processes 40 currently assigned to the processor, according to predetermined scheduling rules. In some embodiments of the invention, scheduler 48 assigns processing sessions of a predetermined length to processes 40, cyclically according to a predetermined order. Alternatively or additionally, the scheduling order depends on the amount of data in the respective input buffers 41 of the processes. Optionally, processes 40 which do not have any packets which require handling, forego the processing session, i.e., return immediately. Alternatively, processes 40 which in a specific scheduling cycle have an empty buffer 41 do not receive from scheduler 48 a processing session in that cycle. Alternatively or additionally, any other scheduling method is used, such as the methods described in U.S. patent application Ser. No. 09/501,078, "Scheduling in a Remote-Access Server", filed on Feb. 9, 2000, U.S. patent application Ser. No. 08/969,981 filed Nov. 13, 1997, PCT application PCT/IL00/00132 filed Feb. 8, 2001 and/or in PCT application PCT/IL00/00733 filed Nov. 9, 2000, the disclosures of which are incorporated herein by reference.

In some embodiments of the invention, schedulers 48 of processors 82 keep track of their load and provide scheduler 84 with indications on their load. Scheduler 84 uses the indications from schedulers 48 in determining the distribution of processes 40 between processors 82. Optionally, schedulers 48 provide scheduler 84 with indications, periodically. Alternatively or additionally, schedulers 48 provide scheduler 84 with indications when substantial changes occur.

In some embodiments of the invention, different processes 40 have different quality of service (QoS) levels which determine the precedence in scheduling when a plurality of connections have data accumulated in their respective buffers 41. Optionally, each processor 82 first handles data of connections with high QoS and only when connections which are entitled to high QoS do not have data in their buffers 41, is the processor 82 scheduled to handle connections with lower QoS levels. Alternatively, scheduler 48 distributes a predetermined percentage of the processing power of processor 82 equally between processes 40 and the remaining processing power is given, additionally, to high QoS processes. It is noted that the order of scheduling is especially important at times when the data connections handled by GNS 22 carry data at a rate greater than can be handled by processor pool 30.

In some embodiments of the invention, a network interface 81 receives packets from packet based network 34 and/or from mobile units 26 and passes the received packets to a distribution processor 88. Distribution processor 88 determines which process 40 is to handle each received packet (according to the connection on which the packet is transmitted) and accordingly places the packet in the respective area 45 of the process. Optionally, distribution processor 88 identifies the connection of a packet according to one or more control fields of the packet, e.g., fields of IP and/or link layer headers of the packet.

In some embodiments of the invention, scheduler 84 is run on a processor separate from processors 82 and distribution processor 86. Alternatively, scheduler 84 runs on distribution processor 86 or on one of processors 82. Alternatively or additionally, the functions of distribution processor 86 are performed by one or more of processors 82 which operates as a distributor in addition to handling packets of one or more data connections. Further alternatively or additionally, processor pool 30 includes a pair of distribution processors, one for signals from mobile units 26 and one for signals from the packet based network.

In some embodiments of the invention, processor pool 30 comprises an output driver 89 which passes the contents of output buffers 44 to their destination. Output driver 89 may be formed of a single processor or device, a plurality of devices and/or may be combined with one or more of the processors of processor pool 30.

In some embodiments of the invention, each time a processor 82 handles a data connection, it retrieves the respective record of the data connection from common memory 86. When the processing is completed, all the information is stored again in common memory 86 for the next time the specific client modem 30 is processed. Alternatively, processors 82 store the records of the processes they are currently handling in a private memory (not shown), and common memory 86 is used, substantially only, for passing received packets to processors 82 and/or when the handling of a data connection is transferred from one processor 82 to another.

In some embodiments of the invention, input buffers 41 are sufficiently large such that when for a short term more data passes on the connections than can be handled by processor pool 30, the data is not lost but is accumulated in buffers 41. In some embodiments of the invention, all of buffers 41 have the same capacity. Alternatively, different buffers 41 have different sizes according to the QoS of the respective data connection. Optionally, connections with high QoS have larger buffers. Alternatively, connections with high QoS, which therefore have less chances of being deprived of service, have smaller buffers. Further alternatively or additionally, one or more groups of buffers 41 are included in a single memory which is dynamically allocated to the different connections according to their needs and/or priorities.

In some embodiments of the invention, the size of buffers 41 is adjusted according to statistical measurements, such that the chances of data being lost due to a large flux of data for a short period is beneath a predetermined likelihood. Optionally, the size of buffers 41 is such that a predetermined percentage (e.g., 50%) of the peak usage of all the connections may be tolerated without loss of data for a predetermined interval (e.g., 10 seconds).

Alternatively to each storage area 45 including a separate input buffer 41 and/or output buffer 44, common memory 86 comprises a common buffer area 90 in which all the input and/or output packets are stored. When a new packet is received and stored in common buffer area 90, a pointer to the stored packet is placed in the respective storage area 45 of the process 40 which is to handle the packet.

In some embodiments of the invention, when a process 40 does not receive data for over a predetermined time, the state record 42 of the process is discarded. When packets are again received by the process 40, compression and/or decompression are performed without the previous history. Possibly, process 40 notifies mobile unit 26 that the state record 42 was erased at the time it is erased. Alternatively, notification on the erasing is sent when data is again transmitted. By erasing state record 42 for unused connections, the amount of memory and power utilized by processes 40 which are not used, is reduced. It is noted that the usefulness of a compression dictionary reduces with time, such that after a predetermined time, the compression dictionary is of very little use.

Alternatively or additionally, when a process 40 is not used for a predetermined time, the process 40 is canceled. In order to again transmit data, the mobile unit 26 must again establish a connection. Optionally, mobile units whose connection was canceled are given precedence in accepting a connection, e.g., are considered as having a high QoS, if they request to reconnect within a predetermined time from the cancellation of their process 40.

In some embodiments of the invention, the idle time of the connections is compared to a plurality of thresholds. If the idle time is longer than a first threshold, e.g., half a minute, state record 42 is erased. When the idle time passes a second threshold, e.g., 2 minutes, the connection is canceled.

When a mobile unit 26 requests to establish a data connection, a data channel is allocated between the mobile unit 26 and GSN 22. Optionally, before allocating the data channel, GSN 22 is consulted to determine whether processor pool 30 can handle an additional data connection.

Figure 3:
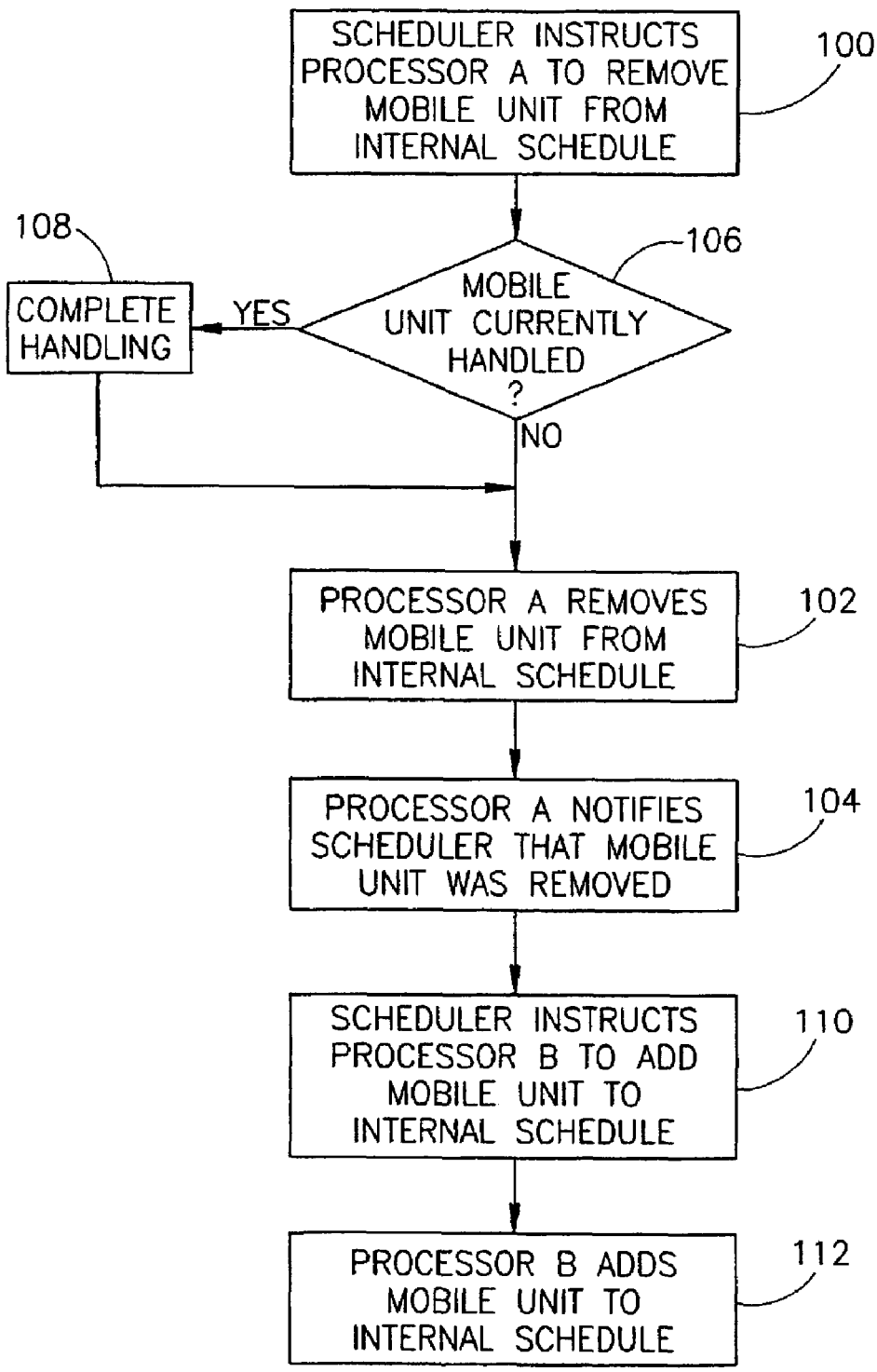
FIG. 3 is a flowchart of the acts performed in transferring the handling of a mobile unit between processors, in accordance with some embodiments of the present invention.

FIG. 3 is a flowchart of the actions performed in transferring the handling of a mobile unit 26 from a first processor 82A to a second processor 82B, in accordance with an embodiment of the present invention. When scheduler 84 determines that the handling of a connection to a particular mobile unit 26 is to be transferred from processor 82A to processor 82B, scheduler 84 instructs (100) processor 82A to remove the particular mobile unit 26 from its internal scheduling order. Processor 82A removes (102) the particular mobile unit 26 from its scheduling order and notifies (104) scheduler 84 that the removal was completed.

In some embodiments of the invention, if (106) the particular mobile unit 26 is currently being handled, processor 82A completes (108) the handling session of the particular mobile unit 26, before it removes (102) the particular mobile unit 26 from its scheduling order. Alternatively, processor 82A waits for a processing session of the mobile unit 26 to be reached and the connection is removed (102) from the scheduling order immediately after the processing session. Thus, the time in which the transferred mobile unit 26 is not handled is minimized. It is noted that this waiting for the processing session may delay the connection transfer by a short period, due to the wait until the turn of the mobile unit 26 to be transferred is reached. Further alternatively, before removing the particular mobile unit 26 from the internal order of processor 82A, processor 82A processes a large block of received packets of the transferred mobile unit 26, out of the scheduling order. Optionally, the out of order processing includes all the packets currently in the buffer of the transferred mobile unit 26. Alternatively, the out of order processing is performed for a predetermined period which is not long enough to seriously impede the service to the other mobile units 26 handled by processor 82A.

Thereafter, scheduler 84 instructs (110) processor 82B to add the transferred mobile unit 26 to its internal scheduling order. In an embodiment of the invention, scheduler 84 supplies processor 82B with the address in common memory 86 of the record of the transferred mobile unit 26. Alternatively, common memory 86 comprises a table 92 (FIG. 4) which lists the addresses of the records of all the mobile units 26 handled by processor pool 30, and processor 82B accesses table 92 to determine the address of the record of the transferred mobile unit 26. Optionally, processor 82B adds (112) the mobile unit 26 to the end of its scheduling order to prevent a delay in the handling of a different mobile unit 26 due to the transfer. Alternatively, processor 82B checks where in the scheduling order the transferred mobile unit 26 can be placed without causing damage to the handling of any of the mobile units 26 handled by processor 82B.

Figure 4:
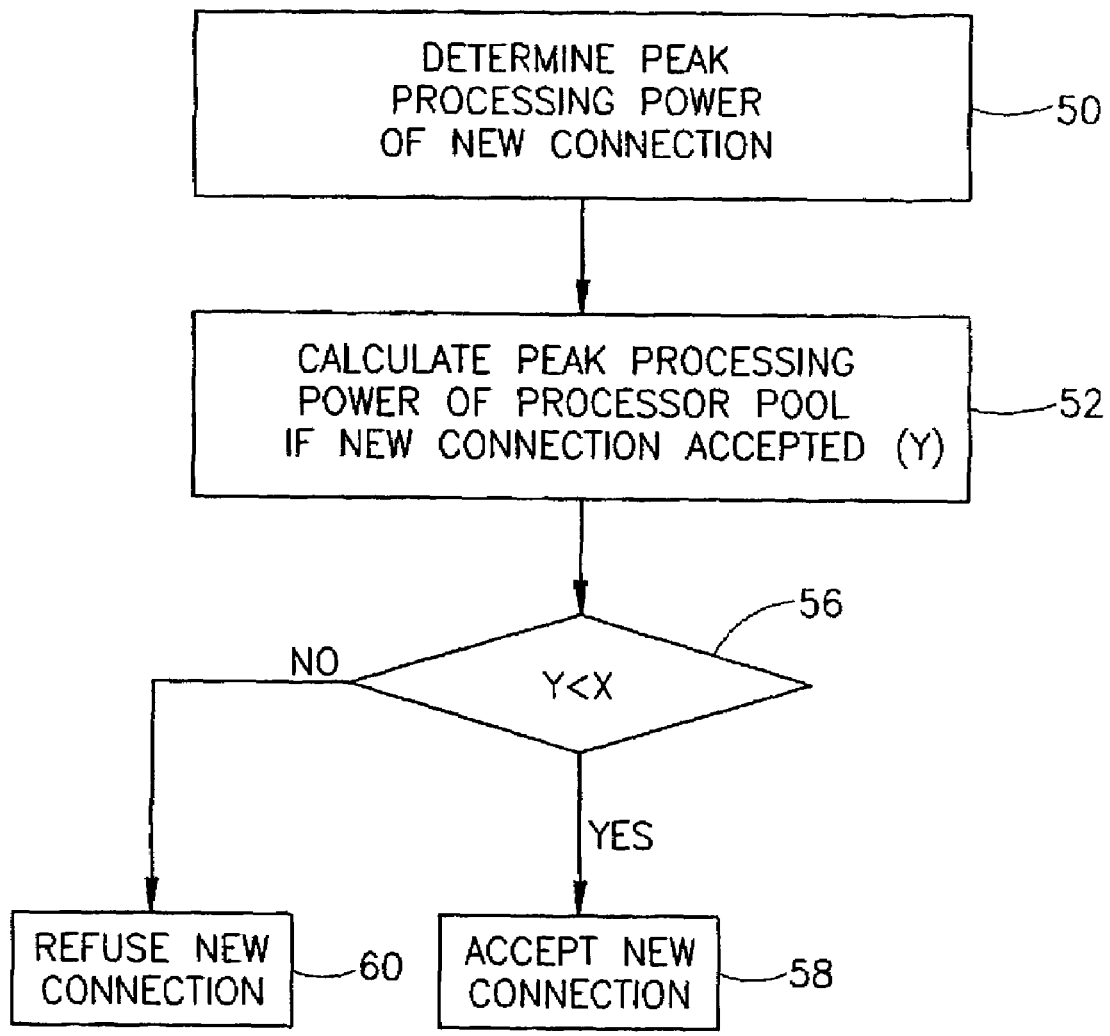
FIG. 4 a flowchart of the acts performed by a GSN in determining whether to accept a request from a mobile unit to establish a data connection, in accordance with some embodiments of the present invention.

FIG. 4 is a flowchart of the acts performed by GSN 22 in determining whether to accept a request from a mobile unit 26 to establish a data connection, in accordance with an embodiment of the present invention. Optionally, GSN 22 determines (50) the peak processing power which the connection to be established will require. In some embodiments of the invention, the peak processing power is determined according to the type of the connection. For example, some wireless access protocol (WAP) connections require only compression services, as in these connections signals sent from mobile units 26 to GSN 22 are not decompressed. Other connections, such as video conferencing connections, require both compression and decompression. Alternatively or additionally, the peak processing power is determined as a function of the maximal bandwidth allocated to the connection. Standard connections, for example, are allocated 115 Kbits/sec and accordingly require a predetermined amount of processing power. In some embodiments of the invention, GSN 22 may accept connections of lower or higher levels of bandwidth which accordingly require different amounts of processing power.

In some embodiments of the invention, GSN 22 calculates (52) the total peak processing power of processor pool 30 if the new connection is accepted (y). Optionally, GSN 22 stores a variable which keeps track of the total peak processing power of the connections currently handled by processor pool 30. Calculating (52) the processing power required if the new connection is accepted is performed by adding the determined (50) peak processing power of the new connection to the stored variable. Keeping track of the total peak processing power optionally includes subtracting from the stored variable the peak processing power which may be required by connections which were disconnected.

In some embodiments of the invention, GSN 22 compares (56) the processing power required if the new connection is accepted to a predetermined peak processing power level (x) which processor pool 30 accepts. The predetermined peak processing power level (x) is substantially greater than the given processing power of processor pool 30. In some embodiments of the invention, the predetermined peak processing power level (x) is determined based on statistics of the usage patterns of data connections, such that the chances of the connections handled by processor pool 30 requiring at a specific time more processing power than the given processing power of the processor pool, is lower than a given value. Optionally, the statistics are of the percentage of time in which packets are transmitted on the connections and/or of the bandwidth utilization of the connections. Generally, the predetermined peak processing power level per processor (x/number of processors 82) increases with the number of processors 82 included in processor pool 30. This is because the variance of the statistical averages decreases as the number of processors 82 increases.

In some embodiments of the invention, the predetermined peak processing power level (x) is at least ten times, or even fifty times, greater than the given processing power of processor pool 30, depending on the number of connections handled by processor pool 30, the quality of service (QoS) promised to the mobile units of the connections and/or the use profiles of the data connections by the mobile units.

If (56) the peak processing power which may be required if the new connection is accepted (y) is lower than the predetermined peak processing power level (x), the new connection is accepted (58) for handling. If, however, the peak processing power which may be required if the new connection is accepted (y) is greater than the predetermined peak processing power level (x), the new connection is refused (60). Alternatively, when the peak processing power required if the new connection is accepted (y) is greater than the predetermined peak processing power level (x), the user of the mobile unit 20 requesting the new connection is offered a low QoS connection which receives service only if processor pool 30 has remaining processing power. If the user accepts the offer, the new connection is accepted with a low QoS process. The low QoS process receives processing sessions only when all regular processes do not require processing sessions. In some embodiments of the invention, processor pool 30 accepts only up to a predetermined number of connections with low QoS processes. Alternatively, processor pool 30 accepts any number of connections with low QoS processes.

Further alternatively or additionally, when the peak processing power required if the new connection is accepted (y) is greater than the predetermined peak processing power level (x) but the peak processing power required by the connections currently handled by processor pool 30 is lower than x, the user is offered a low bandwidth connection which brings the peak processing power to equal x.

In some embodiments of the invention, the predetermined peak processing power level (x) is dynamically adjusted according to one or more external parameters, such as the time, date and/or geographical region. For example, during the day time when there are many users the predetermined peak processing power level (x) is reduced so as to allow more users to connect, although at a lower rate. Alternatively or additionally, it may be known that users at certain times of day have lower utilization rates of their connections. The predetermined peak processing power level (x) may be adjusted automatically or responsive to a command from a human operator.

In some embodiments of the invention, the predetermined peak processing power level (x) is dynamically adjusted responsive to a traffic load in a network including the processor pool. For example, when the network is relatively loaded, the predetermined peak processing power level (x) may be lowered to prevent congestion of the network.

In some embodiments of the invention, the decision of whether to accept a new connection depends additionally on the QoS to which the mobile unit 26 requesting the connection is entitled. Optionally, when the peak processing power required if the new connection is accepted (y) is greater than the predetermined peak processing power level (x) by up to a predetermined margin (m) (i.e., y−x<m), connections are allocated only to high QoS mobile units 26. Optionally, high QoS mobile units which receive connections are mobile units which have a QoS greater than a predetermined percentage (e.g. 50%) of connections currently handled by GSN 22. Alternatively or additionally, the required QoS level is a function of the size of the difference (y−x). If (y−x) is small, connections with a moderately high QoS are accepted. If, however, (y−x) is close to the predetermined margin (m), only connections with a very high QoS are accepted.

Alternatively to performing the determination of whether to accept a new connection based on processing power measures, the determination is performed based on different, substantially equivalent, one or more parameters which are indicative of the processing power. In some embodiments of the invention, simpler measures are used, for example the number of connections and/or the data rates of the connections.

Alternatively or additionally to using a predetermined peak processing power level (x) in determining whether to accept a connection, the current utilization and/or an average of recent utilization is used in determining whether to accept the connection. For example, if the current utilization is below a predetermined level, e.g., 30% of the processing power of processor pool 30, connections are accepted regardless of the predetermined peak processing power level (x).

Although the above description relates to handling GPRS data connections, it is noted that the some of the principles of the present invention may be used in processor pools which perform compression and/or decompression in other data transfer systems.

It will be appreciated that the above described methods may be varied in many ways, including, changing the order of steps, and/or performing a plurality of steps concurrently. For example, in FIG. 3, the removal of a mobile unit from a scheduling order of a first processor and its addition to the scheduling order of a second processor may be performed concurrently. It should also be appreciated that the above described description of methods and apparatus are to be interpreted as including apparatus for carrying out the methods and methods of using the apparatus. The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art. Furthermore, the terms "comprise," "include," "have" and their conjugates, shall mean, when used in the claims, "including but not necessarily limited to."

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims.

The invention claimed is:

1. A method of operating a processor pool having a given maximal processing power, in handling mobile data connections, comprising:

connecting a plurality of mobile data connections, which may require up to a total peak processing power greater than the given maximal processing power of the processor pool, to the processor pool;

assigning a data connection to a first processor of the processor pool;

processing a plurality of first data packets transmitted on the assigned data connection, by a first processor of the processor pool;

transferring the handling of the assigned data connection to a second processor of the processor pool, after processing the plurality of first data packets, by the first processor; and processing a plurality of second data packets transmitted on the assigned data connection, by the second processor of the processor pool after the transfer, wherein after the transfer of the handling to the second processor, data packets of the connection are not handled again by the first processor, and wherein connecting a plurality of mobile data connections comprises connecting a plurality of mobile data connections which may require up to a total peak processing power at least five times greater than the given maximal processing power of the processor pool.

2. A method according to claim 1, wherein connecting a plurality of mobile data connections comprises assigning each connection a processor to handle the data of the connection.

3. A method according to claim 1, wherein transferring the handling of the assigned data connection to a second processor comprises transferring while the connection is carrying data.

4. A method according to claim 3, wherein transferring the handling of the assigned data connection to a second processor comprises transferring substantially immediately after data of the connection is handled.

5. A method according to claim 3, comprising processing the data of the connection substantially immediately after the connection is transferred.

6. A method according to claim 1, wherein transferring the handling of the assigned data connection to a second processor comprises transferring the connection, while the connection is idle.

7. A method according to claim 1, comprising keeping track of the processing load on each of the processors and transferring the handling of the connection from the first processor to the second processor, after handling a plurality of data packets, responsive to the relative loads on the first and second processors.

8. A method according to claim 7, wherein keeping track of the processing load comprises keeping track of the amount of data waiting, in an input buffer, for handling by the processor.

9. A method according to claim 7, wherein keeping track of the processing load of the processors comprises receiving indications from the processors.

10. A method according to claim 1, wherein connecting a plurality of mobile data connections comprises connecting a plurality of mobile data connections which have the same peak processing power requirement level.

11. A method according to claim 1, wherein connecting the plurality of data connections comprises connecting a plurality of data connections which have different peak processing power requirement levels.

12. A method according to claim 1, wherein processing data transmitted on at least one of the connected data connections comprises compressing signals transmitted on the at least one of the data connections.

13. A method according to claim 1, wherein processing data transmitted on at least one of the connected data connections comprises decompressing signals transmitted on the at least one of the data connections.

14. A method according to claim 1, wherein processing data transmitted on at least one of the connected data connections comprises processing by at least one processor which handles data of a plurality of connections.

15. A method according to claim 1, comprising erasing a state record of connections which did not carry data for over a predetermined period.

16. A method according to claim 1, comprising disconnecting connections which did not carry data for over a predetermined period.

17. A method according to claim 1, wherein connecting the plurality of mobile data connections comprises connecting general purpose radio service (GPRS) connections.

18. A method according to claim 1, wherein assigning a data connection to the first processor comprises assigning at least four connections to the first processor.

19. A method according to claim 1, wherein each data packet is handled by only one of the processors.

20. A method of operating a processor pool having a given maximal processing power, in handling mobile data connections, comprising:
connecting a plurality of mobile data connections, which may require up to a total peak processing power greater than the given maximal processing power of the processor pool, to the processor pool;
assigning a data connection to a first processor of the processor pool;
processing a plurality of first data packets transmitted on the assigned data connection, by a first processor of the processor pool;
transferring the handling of the assigned data connection to a second processor of the processor pool, after processing the plurality of first data packets, by the first processor; and
processing a plurality of second data packets transmitted on the assigned data connection, by the second processor of the processor pool, after the transfer,
wherein after the transfer of the handling to the second processor, data packets of the connection are not handled again by the first processor, and
wherein processing data transmitted on at least one of the connected data connections comprises compressing and decompressing signals transmitted on a first group of data connections and only compressing signals on a second group of data connections.

21. A method of servicing a mobile data connection by a processor pool including a plurality of processors, comprising:
compressing and decompressing signals transmitted on a first group of data connections and only compressing signals on a second group of data connections;
handling a first plurality of data packets of a specific mobile data connection by a first processor of the processor pool:
transferring the handling of the specific data connection to a second processor of the pool while the data connection is in force, responsive to an increase in the processing power required by a data connection handled by the first processor, after processing the first plurality of data packets, by the first processor; and
handling by a second plurality of data packets of the specific mobile data connection by the second processor
wherein after the transfer of the handling to the second processor, data packets of the connection are not handled again by the first processor.

22. A method according to claim 21, wherein transferring the handling of the data connection is performed responsive to an increase in the processing power required for handling the data connection.

23. A method according to claim 21, wherein transferring the handling of the data connection is performed responsive to an increase in the processing power required by a different data connection serviced by the first processor.

24. A method according to claim 21, wherein transferring the handling of the data comprises transferring the connection while data is being received on the connection.

25. A method according to claim 21, wherein transferring the handling of the data comprises transferring the connection while the connection is idle.

26. A method according to claim 21, wherein handling data packets of the Specific mobile data connection comprises compressing and decompressing data transmitted on the Specific mobile data connection.

27. A processor pool for servicing mobile data connections, comprising:
a processor pool having a maximal processing power; and
a scheduler adapted to connect the processor pool to a plurality of mobile data connections that may require up to a total peak processing power, which is at least five times greater than the maximal processing power of the processor pool,
wherein the scheduler is adapted to transfer the handling of a data connection from a first processor, that already began handling data of the connection, to a second processor, after a plurality of data packets of the data connection were processed by the first processor, if the first processor has a large backup of accumulated data for processing relative to the second processor,
wherein after the transfer of the handling to the second processor, the scheduler does not transfer handling of the data packets of the connection again to the first processor.

28. A processor pool according to claim 27, wherein the processor pool comprises a plurality of processors.

29. A processor pool according to claim 28, comprising a common memory which includes a record for each of the data connections serviced by the processor pool.

30. A processor pool according to claim 29, wherein the common memory is accessible by all the processors of the processor pool.

31. A processor pool according to claim 28, wherein connections of a first type are connected to a processor from a first group of the processors and connections of a second type are connected to a processor from a second group of the processors, different from the first group.

32. A processor pool according to claim 31, wherein the first and second groups do not include common processors.

33. A processor pool according to claim 31, wherein the first and second groups include at least one processor.

34. A processor pool according to claim 27, wherein the scheduler is adapted to transfer the handling of the data connection from the first processor to the second processor, while the connection is transferring data.

35. A processor pool according to claim 27, wherein each mobile data connection is assigned a buffer of a size sufficient to store data received at the maximal rate of the connection for at least 10 seconds.

36. A processor pool according to claim 35, wherein at least two of the connections have buffers of different sizes.

37. A processor pool according to claim 36, wherein the size of the buffer of each connection is chosen responsive to the QoS of the connection.

* * * * *